United States Patent
Haas et al.

[15] 3,655,971
[45] Apr. 11, 1972

[54] IMAGING SYSTEM

[72] Inventors: Werner E. L. Haas; James E. Adams, both of Webster; James H. Becker, Penfield; Joseph J. Wysocki, Webster, all of N.Y.

[73] Assignee: Xerox Corporation, Rochester, N.Y.

[22] Filed: Aug. 12, 1969

[21] Appl. No.: 849,418

[52] U.S. Cl. .................................. 250/65 R, 96/48, 250/83 R
[51] Int. Cl. ................................................. H01j 37/22
[58] Field of Search .................. 250/83 CD, 83.3 HP, 49.5 E, 250/83 R, 65 R, 65 S; 351/60; 23/230 LC; 96/48

[56] References Cited

FOREIGN PATENTS OR APPLICATIONS 1,041,490  9/1966  Great Britain ..................... 250/83 CD
1,120,093  7/1968  Great Britain ..................... 250/83 CD

OTHER PUBLICATIONS

Electrophotographic Imaging w/Chol. Liq. Crstls. W. Haas et al. Applied Optics vol. 7 No. 6 June 1968 pp. 1203-1208

Liquid Crystal Work Cuts Time in Lg. scale Elec. Uses C & EN Sept. 30, 1968, pp. 32-33

Further Report on Liquid-Crystal Infrared Pattern Viewer- Laser Focus March, 1965, pp. 9-10

"Liquid Crystals & Their Applications"–Kallard Hysteretic Cholesteric Liquid Crystalline Compositions and Recording Devices utilizing such compositions (based on British Patent 1,153,959,–Ferguson et al. 6-4-1969

"Liquid Crystals & Their Applications"–Kallard Visual Display Device (based on Brit. Pat. 1,138,590) Churchill et al. 7-1-1969

*Primary Examiner*—James W. Lawrence
*Assistant Examiner*—D. C. Nelms
*Attorney*—James J. Ralabate, David C. Petre and Roger W. Parkhurst

[57] ABSTRACT

A system wherein a film of liquid crystalline material is exposed to ultraviolet radiation thereby producing a visible image.

53 Claims, 3 Drawing Figures

INVENTORS
WERNER E. L. HAAS
JAMES E. ADAMS
JAMES H. BECKER
JOSEPH J. WYSOCKI

BY *Roger W. Parkhurst*
ATTORNEY

IMAGING SYSTEM

BACKGROUND OF THE INVENTION

This invention relates to imaging systems, and more specifically to an imaging system wherein the imaging member comprises a liquid crystalline material.

Various methods of forming visible images in response to patterns of lights and shadows are well known. Photography and blueprinting are examples of chemical methods wherein incident light induces color changes in light sensitive chemicals. Light has also been used to alter hardness, tackiness, solvent resistance, or receptivity to marking materials of various other photosensitive materials. In addition, recently, palpable, visible images have often been formed by means involving the electrical properties rather than the chemical properties of various photosensitive materials.

Photochromic systems wherein materials undergo reversible photo-induced color changes are now known. For example, when a photochromic material is exposed to activating electromagnetic radiation such as ultra-violet light, the absorption spectrum of the material changes drastically so that the material changes from colorless to red, red to green or the like. Examples of such photochromic systems and materials are described in Brynko U.S. Pat. No. 3,441,410 and Amidon et al. U.S. Pat. No. 3,441,411.

Recently there has been substantial interest in the discovery of more useful applications for a class of substances known as "liquid crystals". The name "liquid crystals" has become generic to liquid crystalline materials which exhibit dual physical characteristics some of which are typically associated with liquids and others which are typically unique to solids. Liquid crystals exhibit mechanical characteristics, such as viscosities, which are ordinarily associated with liquids. The optical scattering and transmission characteristics of liquid crystals are similar to those characteristics ordinarily unique to solids. In liquids or fluids, the molecules are randomly distributed and oriented throughout the mass of the substance. Conversely, in crystalline solids the molecules are generally rigidly oriented and arranged in a specific crystalline structure. Liquid crystals resemble solid crystals in that the molecules of the liquid crystalline substance are regularly oriented in a fashion analogous to but less extensive than the molecular orientation and structure in a crystalline solid. Many substances have been found to exhibit liquid crystalline characteristics in a relatively narrow temperature range; below the temperature range the substances appear only a crystalline solids, and above the temperature range they appear only as liquids. Liquid crystals are known to appear in three different mesomorphic forms: the smectic, nematic, and cholesteric. In each of these structures the molecules are typically arranged in a unique orientation.

Liquid crystals have been found to be sensitive or responsive to temperature, pressure, foreign chemical compounds and to electric and magnetic fields, as disclosed in copending application Ser. No. 646,532, filed June 16, 1967; Ser. No. 646,533, filed June 16, 1967, now abandoned; Ser. No. 821,565; filed May 5, 1969; Fergason et al. U.S. Pat. Nos. 3,114,838, and 3,410,999, French Pat. No. 1,484,584, Fergason U.S. Pat. No. 3,409,404, Waterman et al. U.S. Pat. No. 3,439,525, and in Woodmansee U.S. Pat. No. 3,441,513. It is also known that liquid crystals exhibit various colors under different conditions, and that the same liquid crystalline material may typically appear to have a different color depending upon the angle at which the material is being viewed and the angle at which the viewing light is incident upon the material itself. In Jones C.H., et al., "Investigations of Large-Area Display Screen Using Liquid Crystals," Westinghouse Res. Labs., RADC Report, TR 54-274, Dec., 1965, it was also reported that some liquid crystals are sensitive to ultraviolet irradiation.

In new and growing areas of technology such as liquid crystals, new methods, apparatus, compositions of matter and articles of manufacture continue to be discovered for the application of the new technology in a new mode. The present invention relates to a new and advantageous imaging system using a liquid crystal material as the imaging member.

SUMMARY OF THE INVENTION

It is therefor, an object of this invention to provide a novel imaging system.

It is another object of this invention to provide a novel liquid crystal imaging system.

It is another object of this invention to provide a novel color imaging system.

It is another object of this invention to provide a novel photographic material.

It is another object of this invention to provide a novel photographic plate.

It is another object of this invention to provide a novel photographic process.

It is another object of this invention to provide a novel photographic process which does not require a separate development step.

It is another object of this invention to provide a novel color photographic process.

It is still another object of this invention to provide a novel imaging system using ultraviolet electromagnetic radiation.

It is still another object of this invention to provide a photographic system suitable for using ultraviolet electromagnetic radiation.

It is yet another object of this invention to provide a novel imaging system having cholesteric liquid crystalline materials as the imaging member.

The foregoing objects and others are accomplished in accordance with this invention by a system wherein a film of cholesteric liquid crystalline material is exposed to ultraviolet radiation thereby producing a visible, color image corresponding to the areas of different total exposure.

BRIEF DESCRIPTION OF THE DRAWINGS

For a better understanding of the invention as well as other objects and further features thereof, reference is made to the following disclosure of the preferred embodiments of the invention taken in conjunction with the accompanying drawings thereof, wherein.

DESCRIPTION OF THE PREFERRED EMBODIMENTS

It is known that liquid crystalline materials typically exhibit different characteristic colors depending upon the angle of observation and the angle of incidence of light reflected from the liquid crystalline sample to the observer. These unique color characteristics are a result of the helical structure formed by the molecules. It has been found that the pitch of various liquid crystalline materials may be quite sensitive to various stimuli, including ultraviolet radiation. Similarly, various mixtures of liquid crystals have a pitch which is highly dependent upon their composition. In the present invention, the inventors have found that a change of pitch may result from a change in composition resulting from exposure to ultraviolet radiation.

Figure 1:
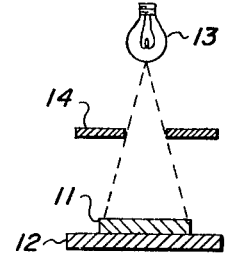
FIG. 1 is a partially schematic, cross sectional view of an imaging member and exposure system of the present invention.

FIG. 1 illustrates an exposure system wherein various samples of liquid crystals may be exposed to ultraviolet radiation by providing a film of the liquid crystalline material 11 upon a suitable substrate 12 and then exposing the material to ultraviolet radiation from a source 13 which may be any suitable source of ultraviolet radiation, for example a high pressure, short arc, mercury lamp.

The liquid crystalline material being exposed as shown in FIG. 1 is typically a film of any suitable liquid crystal. Such films are typically of thicknesses in the range of about 0.1 to about 1,000 microns. A preferred range of thicknesses is the range of about 1 to about 50 microns. For example, films suitable for use in the invention system may be produced by cutting a sample hole of any desired area in a 2 mil Mylar spacer which is then placed on a glass microscope slide or any other suitable substrate. The spacer area is then filled with the liquid crystalline material which has been heated above the isotropic transition temperature for the particular composition, and the sample is then leveled by dragging a glass slide across the spacer having the sample therein. In this way or any other suitable method, samples of approximately uniform thickness may be produced.

The imaging member or plate in this system typically comprises a liquid crystalline film on a suitable substrate. Any suitable material may be used as the substrate. For example, metallic substrates such as copper, aluminum, stainless steel, tin and others; papers, plastics, glass and a host of other materials may be used. The plate may take any suitable form including a web, foil, laminate, metallic strip, sheet, coil, cylinder, drum, endless belt, moebius strip, circular disc or the like. The plate may be of any desired thickness, depending upon its intended application, and in various embodiments may be transparent, translucent or opaque. Of course the substrate should not detrimentally react with or otherwise adversely effect the liquid crystalline imaging film.

The liquid crystalline materials used in the present invention may be any suitable material having a liquid crystalline mesophase, or mixtures thereof. Liquid crystals are known to appear in three mesomorphic forms: the smectic, the nematic, and the cholesteric. Cholesteric liquid crystalline materials have been found to be particularly advantageous in the system of the present invention, and such materials suitable for use in the present invention include: derivatives from reactions of cholesterol and inorganic acids; for example, cholesteryl chloride, cholesteryl bromide, cholesteryl iodide, cholesteryl nitrate, esters derived from reactions of cholesterol and carboxylic acids; for example cholesteryl crotonate; cholesteryl nonanoate; cholesteryl hexanoate; cholesteryl formate; cholesteryl docosonoate; cholesteryl chloroformate, cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from 3 $\beta$-amino-$\Delta^5$-cholestene and mixtures thereof; peptides such as poly-$\gamma$-benzyl-$e$-glutamate; derivatives of beta sitosterol such as sitosteryl chloride; and amyl ester of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

For example, liquid crystal compositions of cholesteryl iodide-cholesteryl nonanoate; cholesteryl bromide-cholesteryl nonanoate; cholesteryl chloride-cholesteryl nonanoate and oleyl cholesteryl carbonate and others have been found to be sensitive to ultraviolet radiation.

Mixtures of liquid crystals can be prepared in organic solvents such as chloroform, petroleum ether, methylethyl ketone and others, which are typically subsequently evaporated from the mixture thereby leaving the liquid crystalline mixture. Alternatively, the individual liquid crystal components of the liquid crystalline mixture can be combined directly by heating the mixed components.

A particularly preferred mixture of cholesteric liquid crystalline materials suitable for use in the present invention comprises a mixture of cholesteryl iodide and cholesteryl nonanoate. It has been shown that in the invention system the exposure of a liquid crystalline film containing cholesteryl iodide results in a pitch shift and an accompanying release of iodine. It is believed that the color or pitch shift in this material is in part due to a change of concentration of the cholesteryl iodide in the liquid crystalline mixture. It is believed that the exposure to ultraviolet light converts the cholesteryl iodide into one or more new compounds; however, the chemical composition of such compounds as well as the roles they may play in the inventive system are not clearly known. It is possible that the effect can be entirely attributed to the removal of cholesteryl iodide molecules from the mixture. For the above reasons any mixture of liquid crystals containing materials, which are sensitive to ultraviolet light in a way such that exposure to ultraviolet radiation has the photochemical effect of changing the composition of the mixture or changing its pitch, is preferred for use in the inventive system. Liquid crystalline compounds containing iodine which is photochemically releasable by exposure to ultraviolet light, i.e. compounds like cholesteryl iodide, are particularly preferred for use in mixtures used in the inventive system.

In the process illustrated in FIG. 1, the liquid crystalline film 11 is shown being exposed through a mask 14. This mask may be in any desired image configuration, and it may be differentially transmissive to the radiation, for example like a photographic transparency. Such optical masks are only one method of modulating the radiation to which the film is exposed, thereby selectively exposing different areas of the film to different total quanta of ultraviolet radiation. The total exposure of a given area of a film may also be controlled by controlling the intensity of the irradiation by varying the magnitude of the source of radiation, the distance of the source from the sample, the total time of exposure, the transmissivity of the mask through which the exposure takes place, and various other means. Indeed any means for selectively controlling the total amount of energy, in the form of ultraviolet electromagnetic radiation, reaching selected areas of the imaging film is suitable for use in the system of the present invention.

In the inventive system the selective exposure of liquid crystalline materials to ultraviolet radiation surprisingly changes the color of the liquid crystalline material continuously over the entire spectrum in response to continuously varied total exposures. This exposure generally permanently changes the color of the exposed liquid crystalline material. However diffusion or mechanical shearing or other mixing events can result in erasure rendering the film reuseable.

Where liquid crystalline films suitable for use in the present invention are prepared by dragging a leveling slide across the surface of the sample, the film is mechanically aligned or disturbed and shows beautiful reflected colors. Where cholesteric liquid crystalline films are used and aligned in this manner, it is believed that the axes of the helicoidal regions, which are characteristic of the cholesteric mesophase, are aligned approximately perpendicular to the substrate upon which the imaging film is coated. Where the liquid crystal is dissolved in a suitable solvent, applied to a suitable substrate and the solvent allowed to evaporate off without leveling alignment, the film is an unaligned or undisturbed film.

Exposure of an unaligned film through a suitable mask generally does not result in an immediately visible image. However, a latent UV exposure image is produced on the film, and that latent image can be developed by heating the film or by exposing the film to an organic solvent vapor, such as chloroform, methyl ethyl ketone, petroleum ether or others.

Where mechanically aligned films are used, the image is generally instantaneously visible and no development step is required.

In other embodiments the imaging film may be exposed while the film material is without its cholesteric liquid crystalline mesophase and thereafter converted into said mesophase whereupon a distinction between exposed and non-exposed areas becomes apparent.

In the inventive system, where the pitch, $p$, of the liquid crystalline material is sensitive to compositional changes, it has been found that pitch is also sensitive to exposure with ultraviolet radiation, $E$. Pitch shifts may be measured by a series of exposure and measurement steps, and the results seem to fit the following general rules. Where $dp/dE$ equals the sensitivity of the material pitch to ultraviolet exposure, and $x$ is the percent by weight of one compound, for example cholesteryl iodide, in the mixture, the inventors have found that in the region where $dp/dX<0$, that $dp/dE<0$. Experimentally, this rate of change of pitch with exposure is exhibited by the fact that UV exposed liquid crystal films turn blue with exposures in the $dp/dX<0$ region. Similarly, in the region where $dp/dX>0$, $dp/dE>0$, which is experimentally confirmed by the observation that UV exposed liquid crystal films turn red in the $dp/dX>0$ region. It has also been found that there is a strong correlation between the absolute values of the derivatives $dp/dX$ and $dp/dE$, or that the rate of change of pitch with composition and the rate of change of pitch with total ultraviolet exposure are apparently closely related.

Figure 2:
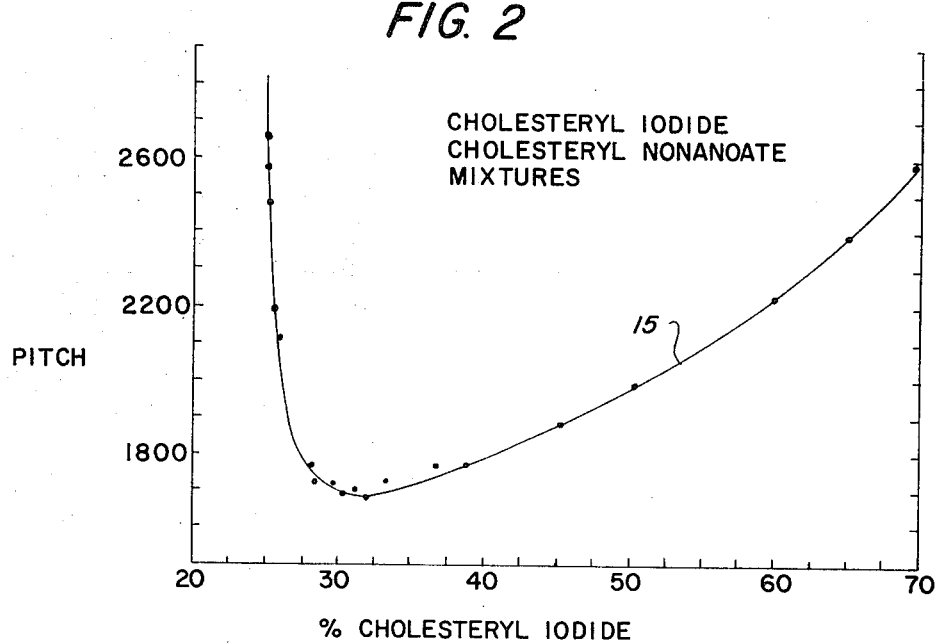
FIG. 2 is a graphic representation of the dependence of the color of an exemplary, two-phase liquid crystalline mixture, expressed in terms of molecular pitch, upon its composition.

When observed at a given angle, a given liquid crystalline material exhibits a characteristic color which is associated with its pitch. Similarly, a specific mixture of liquid crystalline materials has a characteristic color for given observation conditions. FIG. 2 shows the dependence of the characteristic color of a mixture of liquid crystals, here, for example, mixtures of cholesteryl iodide and cholesteryl nonanoate, upon the composition of various mixtures having the same two components. In FIG. 2 the abscissa shows the composition of the liquid crystalline mixture, and the ordinate is a measure of the pitch of the liquid crystalline sample. As discussed above, the color of the liquid crystalline material is dependent upon this pitch.

Figure 3:
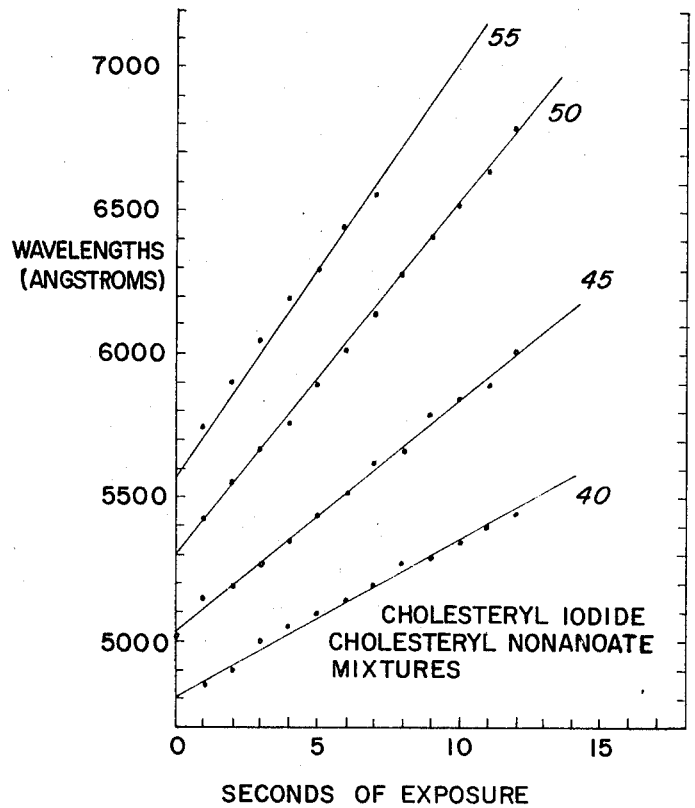
FIG. 3 is a graphic representation of the rate of change of color with total exposure for a series of liquid crystalline compositions of different proportions using the same two component system from which the data of FIG. 2 was taken with angle of incident irradiation of about 60 percent and angle of observation of about 30 percent.

The part of the spectrum of electromagnetic radiation typically referred to as the ultraviolet spectrum is a region of radiation having wavelengths in the range of about 4,000 Angstroms to about 400 Angstroms, the approximate boundries of the visible spectrum and X-ray spectrum, respectively. In the present invention, ultraviolet radiations having wavelengths in the range below about 3,000 Angstroms, have been found particularly useful. In FIG. 3 data showing the change in color corresponding to the quantity of exposure to ultraviolet radiation are shown for a number of various liquid crystalline mixtures. The mixtures used in the experiments from which the data of FIG. 3 were collected were mixtures of the cholesteryl iodide-cholesteryl nonanoate system whose characteristics are also described in the data of FIG. 2. In FIG. 3 the abscissa is expressed in seconds of total exposure, which is a measure of the period of time of which the liquid crystalline sample was exposed to ultraviolet radiation. It will be appreciated that the total quantity of ultraviolet exposure acting on the liquid crystalline materials is directly proportional to the time of exposure, provided the magnitude of the exposure, the distance from the source, and other factors remain substantially constant. The ordinate in FIG. 3 shows the color of the liquid crystalline material having been exposed to ultraviolet radiation, corresponding to the total time of exposure; the colors are expressed in Angstrom units.

It is seen from the data of FIG. 3 that the liquid crystalline material changes color over a large portion of the visible spectrum, which is variously reported in the literature as having a lower wavelength limitation of about 3,800–4,000 Angstroms, and an upper wavelength limit of about 7,000–7,600 Angstroms.

It will also be appreciated that the data of FIG. 3 were collected by the observation of the liquid crystalline material samples after exposure to ultraviolet radiation, said observations being made with a system wherein the angle of incident light and the angle of observation were constant for each of the data points illustrated.

A comparison of the data in FIG. 2 and FIG. 3 shows that there is a relationship between sensitivity to ultraviolet radiation and composition for such liquid crystalline mixtures. Observing the right-hand branch 15 of the curve of FIG. 2, for example in cholesteryl iodide concentrations of from about 60 percent to about 40 percent, it is clear that the slope of the curve decreases as the concentration of cholesteryl iodide decreases. The data of FIG. 3 correlates with the data of FIG. 2 in that with decreasing concentration of cholesteryl iodide, the rate of change of color with total exposure times also decreases, as shown by the decreasing slope of the lines of data in FIG. 3.

These results are logical in view of the experimentally observed facts that iodine is released by the exposure of the mixture containing cholesteryl iodide to ultraviolet radiation.

It will, of course, be appreciated that the data of FIG. 2 and FIG. 3 are for a particular example of a mixture of liquid crystalline materials which are sensitive to UV radiation, and that the inventive system produces the exciting colors in any suitable liquid crystalline material, the mixture of FIGS. 2 and 3 being only representative of such materials.

It is clear that the advantageous system of the present invention is useful as an imaging system wherein color images are produced by selectively exposing a liquid crystalline film with various intensities of ultraviolet radiation. In addition, because the color response of a given liquid crystalline composition to a specific amount and intensity of ultraviolet radiation gives a specific color, the inventive system is suitable for use as a detection system wherein various intensities of ultraviolet light are detected by comparison of their effects upon a known liquid crystal composition with the known calibrated colors for various intensities of ultraviolet exposure.

It is a particularly advantageous feature of the present invention that the exposed liquid crystalline film, which may be though of as a new photographic plate, is directly and instantaneously imaged upon exposure without any development step which is common in other photographic processes.

The following examples further specifically define the present invention. The parts and percentages are by weight unless otherwise indicated. The examples below are intended to illustrate various preferred embodiments of the ultraviolet, liquid crystalline imaging system of this invention.

EXAMPLE I

A liquid crystalline film comprising a mixture of a about 50% cholesteryl iodide and about 50% cholesteryl nonanoate is prepared by heating the liquid crystalline materials in a crucible to a temperature above the isotropic transition temperature of the mixture, mixing the heated materials thoroughly, and depositing the heated mixture onto a glass slide. Samples of approximately uniform thickness of about 2 mils are prepared in this manner by cutting a hole of the desired area in a Mylar spacer about 2 mils in thickness, placing the spacer on the glass slide, filling the hole in the spacer with the heated liquid crystal mixture and dragging a glass slide across the spacer and mixture thereby filling the hole in the spacer and removing excess mixture while shearing and smoothing the sample. The shearing action of the leveling slide aligns the molecules in the sample. The pitch of the sample is determined using the observation apparatus described below.

The plate having the film of liquid crystalline material thereon is then exposed to ultraviolet radiation less than about 3,000 A in wavelengths, produced from a General Electric BH-6 high pressure, short arc mercury lamp. Exposure time is controlled by a shutter. The film material is exposed while in its cholesteric liquid crystalline mesophase. The film material is in its aligned state and shows various reflected colors. During ultraviolet exposure, the color of the film material shifts toward the red, as observed in a fixed observation system. Using this exposure system, about 150 millijoules/cm$^2$ of ultraviolet radiation with wavelengths below about 3,000 A shifts the color peak about 1,000 A.

Samples prepared as shown above are exposed in incrementally increasing amounts of ultraviolet radiation, and incremental changes in colors of the samples changing from blue to red are observed with increasing total exposure.

The ultraviolet exposed liquid crystalline film is observed with a fixed observation apparatus having a source of monochromatic incident light which transmits the incident light beam through a collimating lens system and then to the exposed liquid crystal film which is displayed on a dark background on a spectrometer stage. Since the color of light scattered from a liquid crystal film is a function of the angle of incidence and the angle of observation, the light source and exposed sample are oriented so that the angle of incidence is fixed at about 60° from normal to the plane of the sample. Similarly, the angle of observed, reflected light is fixed at about 30° from normal to the plane of the sample where the reflected light is detected by a photodiode detector in conjunction with an oscilloscope read-out system. A mechanical chopper located in the line of the incident beam provides a reference signal for use with a lock-in amplifier.

Shifts in bright colors of the liquid crystalline material are observed with the eye. Data illustrating the color shifts corresponding to amounts of ultraviolet radiation are shown on the "50" line in FIG. 3. This data shows that the effect of UV radiation is to shift the color of the liquid crystalline sample toward the red.

EXAMPLES II–IV

Liquid crystalline films comprising mixtures of:
II — About 55% cholesteryl iodide and about 45% cholesteryl nonanoate
III — About 45% cholesteryl iodide and about 55% cholesteryl nonanoate; and
IV — About 40% cholesteryl iodide and about 60% cholesteryl nonanoate are exposed to ultraviolet radiation from a General Electric BH-6 mercury arc lamp in the system described in Example I. Results similar to those of this system of Example I are achieved, and the data illustrating the color shifts corresponding to the amounts of ultraviolet radiation are shown on the "55", "45" and "40" lines, respectively, in FIG. 3

EXAMPLE V

A liquid crystalline film comprising a mixture of about 20% cholesteryl iodide and about 80% cholesteryl nonanoate is prepared by dissolving the liquid crystals in petroleum ether in a concentration of about 1g/10cc. and coating the solvent mixture on a polished copper plate, about 3 cm × 4 cm in size. The ether is then allowed to evaporate. The film has a thickness of about 5 microns and is an unaligned liquid crystalline film. The imaging plate is exposed to ultraviolet radiation through a steel mask using a xenon flashtube, Novatron-186 available from Xenon Corporation in the exposure process of Example I. The liquid crystalline material in its originally unaligned state is almost colorless. No image pattern is immediately visible. The exposed film is slowly heated to about 40° C, and the image becomes clearly visible.

EXAMPLE VI

A liquid crystalline film comprising a mixture of about 50% cholesteryl iodide and about 50% cholesteryl nonanoate is prepared on a copper plate and exposed through an image mask as in Example V.

The liquid crystalline film is removed from the copper plate. A high resolution image pattern is observed on the copper plate. It is believed that this image pattern is due to the formation of a copper iodide when iodine is freed by the ultraviolet exposure of the mixture containing cholesteryl iodide.

EXAMPLE VII V through

A liquid crystalline film comprising a mixture of about 50% cholesteryl iodide and about 50% cholesteryl nonanoate is deposited on a substrate of filter paper which has been soaked in a starch solution and dried. This film is exposed as in Example V through an optical mask. A purple image in the shape of the mask is formed on the filter paper apparently due to an iodide-starch reaction which takes place when iodine is freed by the ultraviolet exposure of the mixture containing cholesteryl iodide.

EXAMPLE VIII

A liquid crystal film comprising a mixture of about 50% cholesteryl bromide and about 50% cholesteryl nonanoate is prepared and processed in image configuration as in Example V. Satisfactory images are produced. The sensitivity of this composition is less than the sensitivity of the above compositions.

EXAMPLE IX

A liquid crystal film comprising a mixture of about 50% cholesteryl chloride and about 50% cholesteryl nonanoate is processed as in Example VIII with similar results.

EXAMPLE X

A liquid crystal film comprising a mixture of about 30% cholesteryl chloride, about 30% cholesteryl nonanoate and about 40% oleyl cholesteryl carbonate is processed as in Example VIII. This composition achieves greater sensitivity to ultraviolet radiation than the composition of Example IX.

EXAMPLE XI

A liquid crystalline film is aligned on a copper substrate and processed as in Example V including exposing through a mask made of an electron microscope grid held between the cleavage planes of a piece of mica. The mask is placed as close as possible to the surface of the film. A visible image is produced with resolution in excess of 10 line pairs/mm are achieved.

EXAMPLE XII

A liquid crystalline film comprising about 50% cholesteryl iodide and about 50% cholesteryl nonanoate is imagewise exposed to ultraviolet irradiation. After exposure a small deformation occurs at the boundaries between exposed and unexposed regions of the film. This deformation is enhanced to reach a height of several microns by heating the film above the isotropic transition temperature of the film material.

Although specific components and proportions have been stated in the above description of the preferred embodiments of the advantageous imaging system of the present invention, other suitable materials and variations in the various steps in the system as listed herein, may be used with satisfactory results and various degrees of quality. In addition, other materials and steps may be added to those used herein and variations may be made in the process to synergize, enhance or otherwise modify the properties of or increase the uses for the invention. For example, contact exposure of an ultraviolet sensitive liquid crystal film through a black, white and grey original transparency can enhance the visual contrast between various areas of the transparency which appear as differently colored areas in the exposed liquid crystalline film. Contrast enhancement in X-ray transparencies, for example, may be achieved in this manner.

It will be understood that various other changes in the details, materials, steps and arrangements of parts which have been herein described and illustrated in order to explain the nature of the invention will occur to and may be made by those skilled in the art, upon a reading of this disclosure, and such changes are intended to be included within the principle and scope of this invention.

What is claimed is:

1. An imaging method comprising:
   providing a film comprising a cholesteric liquid crystalline material;
   providing said material in its aligned state; and,
   exposing in imagewise configuration said film to ultraviolet electromagnetic radiation thereby producing a visible image on the film material and at least in part changing the chemical composition of said film material.

2. The imaging method of claim 1 wherein said ultraviolet radiation comprises radiation of wavelengths of less than about 3,000 A.

3. The method of claim 1 wherein said film is provided on a substrate.

4. The method of claim 1 wherein said film is of a thickness in the range between about 0.1 and about 1,000 microns.

5. The method of claim 1 wherein said film is of a thickness in the range between about 1 and about 50 microns.

6. The method of claim 1 wherein said film is selectively exposed to ultraviolet radiation of a plurality of different total exposures in a plurality of different areas, whereby an image is produced having a plurality of different colors in said different areas of selective exposure.

7. The method of claim 1 wherein the exposure in imagewise configuration is performed using an optical mask.

8. The method of claim 7 wherein the optical mask comprises a transparency having different areas of different transmissivity to ultraviolet radiation.

9. A method comprising the method of claim 1 and
   physically remixing the material comprising said liquid crystalline film thereby destroying the visible image thereon and thereby providing the film in its aligned state suitable for re-exposure.

10. The method of claim 3 wherein said substrate is sufficiently transparent to view the liquid crystalline material therethrough.

11. The method of claim 1 wherein said liquid crystalline material comprises a material selected from the group consisting of: cholesteryl iodide, cholesteryl bromide, cholesteryl chloride, cholesteryl nonanoate, and oleyl cholesteryl carbonate.

12. The method of claim 1 wherein the film is exposed under conditions wherein the cholesteric liquid crystalline material is outside of its cholesteric liquid crystalline state, and it is thereafter brought into said liquid crystalline state whereupon the image becomes visible.

13. The method of claim 1 wherein said visible image is a permanently visible image.

14. An imaging method comprising:
    providing a film comprising a cholesteric liquid crystalline material;
    providing said material in its unaligned state; and
    exposing in imagewise configuration said film to ultraviolet electromagnetic radiation thereby producing a latent image on the film material and at least in part changing the chemical composition of said film material; and
    developing said latent image into a visible image by heating the exposed film.

15. The imaging method of claim 14 wherein said ultraviolet radiation comprises radiation of wavelengths of less than about 3,000.

16. The method of claim 14 wherein said film is provided on a substrate.

17. The method of claim 16 wherein said substrate is sufficiently transparent to view the liquid crystalline material therethrough.

18. The method of claim 14 wherein said film is of a thickness in the range between about 0.1 and about 1,000 microns.

19. The method of claim 14 wherein said film is of a thickness in the range between about 1 and about 50 microns.

20. The method of claim 14 wherein said liquid crystalline material comprises a material selected from the group consisting of: cholesteryl iodide, cholesteryl bromide, cholesteryl chloride, cholesteryl nonanoate, and oleyl cholesteryl carbonate.

21. The method of claim 14 wherein said film is selectively exposed to ultraviolet radiation of a plurality of different total exposures in a plurality of different areas whereby an image is produced having a plurality of different colors in said different areas of selective exposure.

22. The method of claim 14 wherein the exposure in imagewise configuration is performed using an optical mask.

23. The method of claim 22 wherein the optical mask comprises a transparency having different areas of different transmissivity to ultraviolet radiation.

24. A method comprising
    the method of claim 14, and
    physically remixing the material comprising said liquid crystalline film thereby destroying the visible image thereon and providing the film in its unaligned state suitable for re-exposure.

25. The method of claim 14 wherein the film is exposed under conditions wherein the cholesteric liquid crystalline material is outside of its cholesteric liquid crystalline state, and it is thereafter brought into said liquid crystalline state whereupon the image becomes visible.

26. The method of claim 14 wherein said visible image is a permanently visible image.

27. The method of claim 14 wherein said visible image is a permanently visible image.

28. A deformation imaging process comprising
    providing a film comprising a material having a cholesteric liquid crystalline mesophase,
    exposing in imagewise configuration said film to ultraviolet electromagnetic radiation while said film is in its cholesteric liquid crystalline mesophase, thereby producing a deformation in said film at the boundaries between exposed and unexposed areas.

29. The process of claim 28 wherein the deformation is enhanced by heating the deformation imaged film above the isotropic transition temperature of said film material.

30. The process of claim 28 wherein said deformation imaging is accompanied by a visible change in color of the exposed area of said film.

31. The imaging process of claim 28 wherein said ultraviolet radiation comprises radiation of wavelengths of less than about 3,000. A.

32. The process of claim 28 wherein said film is provided on a substrate.

33. The method of claim 32 wherein said substrate is sufficiently transparent to view the liquid crystalline material therethrough.

34. The process of claim 28 wherein said film is of a thickness in the range between about 0.1 and about 1,000 microns.

35. The process of claim 28 wherein said film is of a thickness in the range between about 1 and about 50 microns.

36. The method of claim 30 wherein said liquid crystalline material comprises a material selected from the group consisting of: cholesteryl iodide, cholesteryl bromide, cholesteryl chloride, cholesteryl nonanoate, and oleyl cholesteryl carbonate.

37. The process of claim 30 wherein said film is selectively exposed to ultraviolet radiation of a plurality of different total exposures in a plurality of different areas whereby an image is produced having a plurality of different colors in said different areas of selective exposure.

38. The process of claim 28 wherein the exposure in imagewise configuration is performed using an optical mask.

39. The process of claim 38 wherein the optical mask comprises a transparency having different areas of different transmissivity to ultraviolet radiation.

40. A process comprising
the process of claim 28 and
physically remixing the material comprising said liquid crystalline film thereby destroying the image thereon and providing the film in condition for re-exposure.

41. The method of claim 30 wherein said visible image is a permanently visible image.

42. An imaging method comprising:
providing a film comprising a cholesteric liquid crystalline material;
providing said material in its unaligned state; and
exposing in imagewise configuration said film to ultraviolet electromagnetic radiation thereby producing a latent image on the film material and at least in part changing the chemical composition of said film material; and
developing said latent image into a visible image by contacting the exposed film with organic solvent vapors.

43. The imaging method of claim 42 wherein said ultraviolet radiation comprises radiation of wavelengths of less than about 3,000 Angstroms.

44. The method of claim 42 wherein said film is provided on a substrate.

45. The method of claim 44 wherein said substrate is sufficiently transparent to view the liquid crystalline material therethrough.

46. The method of claim 42 wherein said film is of a thickness in the range between about 0.1 and about 1,000 microns.

47. The method of claim 42 wherein said film is of a thickness in the range between about 1 and about 50 microns.

48. The method of claim 42 wherein said liquid crystalline material comprises a material selected from the group consisting of: cholesteryl iodide, cholesteryl bromide, cholesteryl chloride, cholesteryl nonanoate, and oleyl cholesteryl carbonate.

49. The method of claim 42 wherein said film is selectively exposed to ultraviolet radiation of a plurality of different total exposures in a plurality of different areas whereby an image is produced having a plurality of different colors in said different areas of selective exposure.

50. The method of claim 42 wherein the exposure in imagewise configuration is performed using an optical mask.

51. The method of claim 50 wherein the optical mask comprises a transparency having different areas of different transmissivity to ultraviolet radiation.

52. A method comprising
the method of claim 42, and
physically remixing the material comprising said liquid crystalline film thereby destroying the visible image thereon and providing the film in its unaligned state suitable for re-exposure.

53. The method of claim 42 wherein the film is exposed under conditions wherein the cholesteric liquid crystalline material is outside of its cholesteric liquid crystalline state, and it is thereafter brought into said liquid crystalline state whereupon the image become visible.

* * * * *

Disclaimer 3,655,971.—*Werner E. L. Haas* and *James E. Adams*, Webster, *James H. Becker*, Penfield, and *Joseph J. Wysocki*, Webster, N.Y. IMAGING SYSTEM. Patent dated Apr. 11, 1972. Disclaimer filed Nov. 20, 1972, by the assignee, *Xerox Corporation*.

Hereby enters this disclaimer to claim 27 of said patent.

[*Official Gazette September 4, 1973.*]